(12) United States Patent
Fulle et al.

(10) Patent No.: US 12,269,957 B1
(45) Date of Patent: Apr. 8, 2025

(54) INK FORMULATION FOR THERMAL INKJET PRINTING

(71) Applicant: WIKOFF COLOR CORPORATION, Fort Mill, SC (US)

(72) Inventors: Lucas Russell Fulle, Charlotte, NC (US); Kai Yang, Upper Macungie Township, PA (US)

(73) Assignee: WIKOFF COLOR CORPORATION, Fort Mill, SC (US)

(*) Notice: Subject to any disclaimer, the term of this patent is extended or adjusted under 35 U.S.C. 154(b) by 663 days.

(21) Appl. No.: 17/516,482

(22) Filed: Nov. 1, 2021

Related U.S. Application Data

(60) Provisional application No. 63/108,752, filed on Nov. 2, 2020.

(51) Int. Cl.
| | |
|---|---|
| C09D 11/36 | (2014.01) |
| B42D 25/382 | (2014.01) |
| B42D 25/387 | (2014.01) |
| C09D 11/033 | (2014.01) |
| C09D 11/037 | (2014.01) |
| C09D 11/103 | (2014.01) |
| C09D 11/322 | (2014.01) |
| C09D 11/328 | (2014.01) |
| C09D 11/38 | (2014.01) |
| C09D 11/50 | (2014.01) |

(52) U.S. Cl.
CPC ............ *C09D 11/36* (2013.01); *B42D 25/382* (2014.10); *B42D 25/387* (2014.10); *C09D 11/033* (2013.01); *C09D 11/037* (2013.01); *C09D 11/103* (2013.01); *C09D 11/322* (2013.01); *C09D 11/328* (2013.01); *C09D 11/38* (2013.01); *C09D 11/50* (2013.01)

(58) Field of Classification Search
CPC ..... C09D 11/36; C09D 11/037; C09D 11/103; C09D 11/322; C09D 11/328; C09D 11/38; C09D 11/50; B42D 25/382; B42D 25/387

See application file for complete search history.

(56) References Cited

U.S. PATENT DOCUMENTS

| | | | |
|---|---|---|---|
| 8,087,766 B2 | 1/2012 | Barreto et al. | |
| 8,182,597 B2 | 5/2012 | Robertson et al. | |
| 8,632,630 B2 | 1/2014 | Robertson et al. | |
| 9,670,372 B2 * | 6/2017 | Cross | C09D 11/107 |
| 9,957,401 B2 | 5/2018 | Brown et al. | |
| 10,344,173 B2 * | 7/2019 | Takemoto | B41J 2/01 |
| 2011/0012954 A1 | 1/2011 | Brown et al. | |
| 2013/0327247 A1 | 12/2013 | Khavari | |
| 2015/0291816 A1 | 10/2015 | Cross et al. | |
| 2017/0037269 A1 | 2/2017 | Isobe | |
| 2017/0240757 A1 | 8/2017 | Robertson et al. | |
| 2018/0072902 A1 | 3/2018 | Takemoto et al. | |
| 2018/0112093 A1 * | 4/2018 | Cai | C09K 11/02 |
| 2018/0251650 A1 * | 9/2018 | Xue | C09D 11/102 |
| 2019/0111677 A1 * | 4/2019 | Watanabe | C09D 11/322 |
| 2023/0031477 A1 * | 2/2023 | Matsumoto | C09D 11/32 |
| 2023/0312952 A1 * | 10/2023 | Matsumoto | C09D 11/38 |
| | | | 524/280 |

FOREIGN PATENT DOCUMENTS

| | | | |
|---|---|---|---|
| EP | 2546833 A1 | 5/2012 | |
| EP | 3237554 A1 | 11/2017 | |
| EP | 3350268 A1 | 7/2018 | |
| WO | 2016106222 A1 | 6/2016 | |
| WO | 2018075060 A9 | 4/2018 | |
| WO | 2020112127 A1 | 6/2020 | |

OTHER PUBLICATIONS

Guo, Yichen et al. "Enhancing the Mechanical Properties of Biodegradable Polymer Blends Using Tubular Nanoparticle Stitching of the Interfaces" ACS Appl Mater Interfaces. Jul. 13, 2016;8(27):17565-73 (Abstract) (2 pages).

* cited by examiner

*Primary Examiner* — Jane L Stanley
(74) *Attorney, Agent, or Firm* — Tillman Wright, PLLC; David R. Higgins; James D. Wright

(57) ABSTRACT

A thermal inkjet ink for industrial printing applications includes a primary solvent that includes at least a short chain alcohol, a tackifier that includes a terpene phenolic resin, one or more cosolvents that include at least an ester or a ketone, and a colorant that includes a pigment, a dye, or a combination thereof. The thermal inkjet ink may optionally include other components including, but not limited to, additional tackifiers or resins, one or more surfactants, a lubricant, and a security taggant.

17 Claims, 9 Drawing Sheets

|  | 1-1 | 1-2 | 1-3 | 1-4 | 1-5 | 1-6 | 1-7 |
|---|---|---|---|---|---|---|---|
| Ethanol | 60 | 60 | 63 | 65.5 | 61.5 | 64.25 | 64.65 |
| n-Propanol | 15 | 20 | 20 | 20 | 20 | 20 | 20 |
| Acetone | 5 | | | | | | |
| Cyclohexanone | | 1.5 | 1.5 | 1.5 | | 1.5 | 1.5 |
| Ethyl Acetate | | | | | 1.9 | | |
| Glycol Ether PM | 5 | | | | | | |
| Dertophene T | | | 3 | 1.5 | | 3 | 3 |
| Dertophene T 105 | 3.5 | 3 | | 1.5 | 3 | | |
| Phenolite TD-2090 | | | 1.5 | 1 | 1.5 | 1.5 | 1.5 |
| Phenolite TD-2093 | | 3 | | | | | |
| Phenolite TD-2106 | | 3 | | | | | |
| Phenolite TD-2131 | | | 1.5 | 1 | 1.5 | 1.5 | 1.5 |
| HK-100 | 2 | | | | | | |
| Solvent Black 27 | | | | 7 | | | |
| Solvent Black 29 | 8 | 8 | 8 | | 8 | 7 | 6 |
| Solvent Orange 54 | 1 | 1 | 1 | 1 | 1 | 1 | 1 |
| Capstone FS-22 | 0.5 | 0.5 | 0.5 | | 1.5 | | |
| BYK-377 | | | | | | 0.05 | 0.05 |
| BYK-3760 | | | | | | 0.2 | 0.2 |
| Oleic Amide | | | | | 0.1 | | 0.6 |
|  | 100 | 100 | 100 | 100 | 100 | 100 | 100 |

| Decap Performance | C | B | B | B | B | C | C |
|---|---|---|---|---|---|---|---|
| Dry Time | B | A | A | A | A | B | B |
| Barcode Readability | Pass | Fail | Pass | Pass | Pass | Fail | Fail |

*FIG. 1*

|  | 2-1 | 2-2 | 2-3 | 2-4 | 2-5 | 2-6 | 2-7 |
|---|---|---|---|---|---|---|---|
| Ethanol | 61.1 | 64 | 65.1 | 66.7 | 64.6 | 64.6 | 64.6 |
| n-Propanol | 20 | 16 | 15 | 15 | 15 | 15 | 15 |
| n-Butanol | 1 | 1 | 1 | 1 | 1 | 1 | 1 |
| Acetone |  | 2 | 2 | 2 | 2 | 2 | 2 |
| Cyclohexanone | 0.5 | 0.5 | 0.5 | 0.5 | 0.5 | 0.5 | 0.5 |
| Sylvares TP96 | 5 | 4 | 5 | 5 | 5 | 5 | 5 |
| Phenolite TD-2090 | 1.5 | 1.5 |  |  |  |  |  |
| Phenolite TD-2131 | 1.5 | 1.5 |  |  |  |  |  |
| UNIREZ 2215 |  |  | 1.5 |  | 1.5 |  |  |
| Reactol 1111E |  |  |  |  |  | 1.5 |  |
| Joncryl 690 |  |  |  |  |  |  | 1.5 |
| Solvent Black 27 | 7 | 7 | 7 | 7 | 7 | 7 | 7 |
| Solvent Orange 54 | 1 | 1 | 1 | 1 | 1 | 1 | 1 |
| BYK-3760 | 0.2 | 0.2 | 0.3 | 0.2 | 0.3 | 0.3 | 0.3 |
| DYNWET 800N | 1 | 1 | 1 | 1 | 1 | 1 | 1 |
| Tergitol 15-S-7 |  |  |  |  | 0.2 | 0.2 | 0.2 |
| Oleic Amide | 0.2 | 0.3 | 0.6 | 0.6 | 0.6 | 0.6 | 0.6 |
| Dispersogen LFH |  |  |  |  | 0.3 | 0.3 | 0.3 |
|  | 100 | 100 | 100 | 100 | 100 | 100 | 100 |

|  | 2-1 | 2-2 | 2-3 | 2-4 | 2-5 | 2-6 | 2-7 |
|---|---|---|---|---|---|---|---|
| Optical Density | B | A | A | A | A | A | A |
| Decap Performance | B | B | A | A | A | B | B |
| Dry Time | B | A | A | A | A | A | A |
| Barcode Readability | C | C | C | C | C | C | C |

FIG. 2

|  | 3-1 | 3-2 | 3-3 | 3-4 | 3-5 | 3-6 | 3-7 | 3-8 |
|---|---|---|---|---|---|---|---|---|
| Ethanol | 67.9 | 67.9 | 66.6 | 66.6 | 66.7 | 66.2 | 66 | 65.8 |
| n-Propanol | 15 | 15 | 15 | 15 | 15 | 15 | 15 | 15 |
| n-Butanol | 1 | 1 | 1 | 1 | 1 | 1 | 1 | 1 |
| Acetone | 2 | 2 | 2 | 2 | 2 | 2 | 2 | 2 |
| Cyclohexanone | 0.5 | 0.5 | 0.5 | 0.5 | 0.5 | 0.5 | 0.5 | 0.5 |
| Dertophene T | 5 |  |  |  |  |  |  |  |
| Sylvares TP96 |  |  |  |  | 5 | 5 | 5 | 5 |
| Sylvares TP300 |  |  |  | 5 |  |  |  |  |
| Filtrez 530 |  | 5 |  |  |  |  |  |  |
| Filtrez 531 |  |  | 5 |  |  |  |  |  |
| Solvent Black 27 | 6 | 6 | 7 | 7 | 7 | 7 | 7 | 7 |
| Solvent Orange 54 | 1 | 1 | 1 | 1 | 1 | 1 | 1 | 1 |
| BYK-378 |  |  |  |  | 0.2 | 0.2 | 0.2 | 0.2 |
| BYK-3550 |  |  |  |  |  | 1.5 | 1.5 | 1.5 |
| BYK-3760 | 0.2 | 0.2 | 0.3 | 0.3 |  |  |  |  |
| DYNWET 800N | 0.8 | 0.8 | 1 | 1 | 1 |  |  |  |
| Oleic Amide | 0.6 | 0.6 | 0.6 | 0.6 | 0.6 | 0.6 | 0.3 |  |
| TEA99 |  |  |  |  |  |  | 0.5 | 1 |
|  | 100 | 100 | 100 | 100 | 100 | 100 | 100 | 100 |

| | 3-1 | 3-2 | 3-3 | 3-4 | 3-5 | 3-6 | 3-7 | 3-8 |
|---|---|---|---|---|---|---|---|---|
| Optical Density | B | B | B | B | A | A | A | A |
| Decap Performance | B | A | A | B | A | A | A | A |
| Dry Time | A | B | B | B | A | A | A | A |
| Barcode Readability | C | C | C | C | C | B | B | B |
| Satellites | C | C | C | C | C | B | B | A |

*FIG. 3A*

|  | 3-9 | 3-10 | 3-11 | 3-12 | 3-13 | 3-14 |
|---|---|---|---|---|---|---|
| Ethanol | 65.8 | 65.8 | 65.8 | 65.8 | 65.8 | 65.8 |
| n-Propanol | 15 | 15 | 15 | 15 | 15 | 15 |
| n-Butanol | 1 | 1 | 1 | 1 | 1 | 1 |
| Acetone | 2 | 2 | 2 | 2 | 2 | 2 |
| Cyclohexanone | 0.5 | 0.5 | 0.5 | 0.5 | 0.5 | 0.5 |
| Tackifier Type | TP | TP | TP | TP | TP | TP |
| Tackifier Name | Sylvares TP96 | Sylvares 1095 | Sylvares TP2019 | Dertophene T | Dertophene T 105 | Dertophene T 115 |
| Tackifier Loading | 5 | 5 | 5 | 5 | 5 | 5 |
| Solvent Black 27 | 7 | 7 | 7 | 7 | 7 | 7 |
| Solvent Orange 54 | 1 | 1 | 1 | 1 | 1 | 1 |
| BYK-378 | 0.2 | 0.2 | 0.2 | 0.2 | 0.2 | 0.2 |
| BYK-3550 | 1.5 | 1.5 | 1.5 | 1.5 | 1.5 | 1.5 |
| TEA99 | 1 | 1 | 1 | 1 | 1 | 1 |
|  | 100 | 100 | 100 | 100 | 100 | 100 |

|  | 3-9 | 3-10 | 3-11 | 3-12 | 3-13 | 3-14 |
|---|---|---|---|---|---|---|
| Optical Density | A | A | A | A | A | A |
| Decap Performance | A | B | A | C | C | B |
| Dry Time | A | A | A | A | A | A |
| Barcode Readability | B | B | B | B | B | B |

*FIG. 3B*

|  | 3-15 | 3-16 | 3-17 | 3-18 | 3-19 | 3-20 |
|---|---|---|---|---|---|---|
| Ethanol | 65.8 | 68.3 | 68.3 | 68.3 | 68.3 | 68.3 |
| n-Propanol | 15 | 15 | 15 | 15 | 15 | 15 |
| n-Butanol | 1 | 1 | 1 | 1 | 1 | 1 |
| Acetone | 2 | 2 | 2 | 2 | 2 | 2 |
| Cyclohexanone | 0.5 | 0.5 | 0.5 | 0.5 | 0.5 | 0.5 |
| Tackifier Type | TP | Ro | Ro | Ro | Ro | Ro |
| Tackifier Name | Sylvares TP300 | Sylvalite RE100L | Pensel D-125 | Foral 105 | Filtrez 530 | Filtrez 531 |
| Tackifier Loading | 5 | 2.5 | 2.5 | 2.5 | 2.5 | 2.5 |
| Solvent Black 27 | 7 | 7 | 7 | 7 | 7 | 7 |
| Solvent Orange 54 | 1 | 1 | 1 | 1 | 1 | 1 |
| BYK-378 | 0.2 | 0.2 | 0.2 | 0.2 | 0.2 | 0.2 |
| BYK-3550 | 1.5 | 1.5 | 1.5 | 1.5 | 1.5 | 1.5 |
| TEA99 | 1 | 1 | 1 | 1 | 1 | 1 |
|  | 100 | 100 | 100 | 100 | 100 | 100 |

|  | 3-15 | 3-16 | 3-17 | 3-18 | 3-19 | 3-20 |
|---|---|---|---|---|---|---|
| Optical Density | A | A | A | A | A | A |
| Decap Performance | C | A | C | A | A | A |
| Dry Time | A | B | B | B | B | B |
| Barcode Readability | B | B | B | B | C | C |

FIG. 3C

|  | 4-1 | 4-2 | 4-3 | 4-4 | 4-5 |
|---|---|---|---|---|---|
| Ethanol | 65.8 | 64 | 65.8 | 65.8 | 65.8 |
| n-Propanol | 15 | 15 | 13.5 | 10.5 | 7.5 |
| n-Butanol | 1 | 1 | 2 | 4 | 6 |
| Acetone | 2 | 2 | 2 | 2 | 2 |
| Cyclohexanone | 0.5 | 0.5 | 1 | 2 | 3 |
| 2-Pentanone |  | 1.8 |  |  |  |
| Sylvares TP96 | 5 | 5 | 5 | 5 | 5 |
| Foral 105 |  |  |  |  |  |
| CAB 551-0.01 |  |  |  |  |  |
| Joncryl 680 |  |  |  |  |  |
| Solvent Black 27 | 7 | 7 | 7 | 7 | 7 |
| Solvent Orange 54 | 1 | 1 | 1 | 1 | 1 |
| BYK-378 | 0.2 | 0.2 | 0.2 | 0.2 | 0.2 |
| BYK-3550 | 1.5 | 1.5 | 1.5 | 1.5 | 1.5 |
| TEA99 | 1 | 1 | 1 | 1 | 1 |
|  | 100 | 100 | 100 | 100 | 100 |

| | 4-1 | 4-2 | 4-3 | 4-4 | 4-5 |
|---|---|---|---|---|---|
| Optical Density | A | A | A | A | A |
| Decap Performance | A | A | A | A | A |
| Dry Time | A | A | A | B | C |
| Barcode Readability | B | B | B | B | B |
| Intermittent Print Performance | B | B | B | A | A |

*FIG. 4A*

|  | 4-6 | 4-7 | 4-8 | 4-9 |
|---|---|---|---|---|
| Ethanol | 67.8 | 66.05 | 66.05 | 66.05 |
| n-Propanol | 15 | 12 | 12 | 12 |
| n-Butanol | 1 | 4 | 4 | 4 |
| Acetone | 2 | 2 | 2 | 2 |
| Cyclohexanone | 0.5 | 2 | 2 | 2 |
| 2-Pentanone |  |  |  |  |
| Sylvares TP96 | 1 | 1.5 | 1.5 | 1.5 |
| Foral 105 | 2 | 1.75 |  |  |
| CAB 551-0.01 |  |  | 1.75 |  |
| Joncryl 680 |  |  |  | 1.75 |
| Solvent Black 27 | 7 | 7 | 7 | 7 |
| Solvent Orange 54 | 1 | 1 | 1 | 1 |
| BYK-378 | 0.2 | 0.2 | 0.2 | 0.2 |
| BYK-3550 | 1.5 | 1.5 | 1.5 | 1.5 |
| TEA99 | 1 | 1 | 1 | 1 |
|  | 100 | 100 | 100 | 100 |

| | 4-6 | 4-7 | 4-8 | 4-9 |
|---|---|---|---|---|
| Optical Density | A | A | A | A |
| Decap Performance | A | A | A | A |
| Dry Time | A | A | A | A |
| Barcode Readability | B | B | B | B |
| Intermittent Print Performance | B | A | A | A |

FIG. 4B

|  | 5-1 | 5-2 | 5-3 | 5-4 | 5-5 | 5-6 | 5-7 | 5-8 | 5-9 | 5-10 |
|---|---|---|---|---|---|---|---|---|---|---|
| Ethanol | 66.4 | 67.7 | 67.7 | 60.2 | 60.2 | 60.2 | 60.2 | 57.2 | 64.7 | 57.2 |
| n-Propanol | 15 | 15 | 15 | 15 | 15 | 15 | 15 | 15 | 15 | 15 |
| n-Butanol | 1 | 1 | 1 | 1 | 1 | 1 | 1 | 1 | 1 | 1 |
| Acetone | 2 | 2 | 2 | 2 | 2 | 2 | 2 | 2 | 2 | 2 |
| Cyclohexanone | 0.5 | 0.5 | 0.5 | 0.5 | 0.5 | 0.5 | 0.5 | 0.5 | 0.5 | 0.5 |
| Ethyl Acetate |  |  |  | 7.5 | 7.5 | 7.5 | 7.5 | 7.5 |  | 7.5 |
| Sylvares TP96 | 5 | 5 | 5 | 5 | 5 | 5 | 5 | 5 | 5 | 5 |
| RC-B |  |  |  |  |  | 4.9 |  |  |  |  |
| SC-18 | 3 | 2.1 | 2.1 | 2.1 | 2.1 | 2.1 | 2.1 | 3 | 3 | 3 |
| D298 | 5 | 4.9 |  |  |  |  |  | 7 |  |  |
| HM-35 |  |  | 4.9 |  |  |  | 4.9 |  | 7 | 7 |
| D286 |  |  |  | 4.9 |  |  |  |  |  |  |
| D211 |  |  |  |  | 4.9 |  |  |  |  |  |
| BYK-378 |  | 0.2 | 0.2 | 0.2 | 0.2 | 0.2 | 0.2 | 0.2 | 0.2 | 0.2 |
| BYK-3760 | 0.2 |  |  |  |  |  |  |  |  |  |
| DYNWET 800N | 1 | 1 | 1 | 1 | 1 | 1 | 1 | 1 | 1 | 1 |
| Oleic Amide | 0.6 | 0.6 | 0.6 | 0.6 | 0.6 | 0.6 | 0.6 | 0.6 | 0.6 | 0.6 |
| Dispersogen LFH | 0.3 |  |  |  |  |  |  |  |  |  |
|  | 100 | 100 | 100 | 100 | 100 | 100 | 100 | 100 | 100 | 100 |

| Decap Performance | A | A | A | N/A | N/A | N/A | A | B | A | B |
|---|---|---|---|---|---|---|---|---|---|---|
| Dry Time | A | A | A | N/A | N/A | N/A | A | A | A | A |
| Fluorescent Glow | C | C | A | B | B | B | A | B | A | A |

FIG. 5A

|  | 5-11 | 5-12 | 5-13 | 5-14 | 5-15 | 5-16 | 5-17 |
|---|---|---|---|---|---|---|---|
| Ethanol | 47.2 | 62.7 | 61.7 | 61.7 | 60.2 | 60.2 | 55.2 |
| n-Propanol | 15 | 15 | 15 | 15 | 15 | 15 | 15 |
| n-Butanol | 1 | 1 | 1 | 1 | 1 | 1 | 1 |
| Acetone | 2 | 2 | 2 | 2 | 2 | 2 | 2 |
| Cyclohexanone | 0.5 | 0.5 | 0.5 | 0.5 | 0.5 | 0.5 | 0.5 |
| Ethyl Acetate |  |  | 7.5 | 7.5 | 7.5 | 7.5 | 7.5 |
| n-Propyl Acetate |  |  |  |  |  |  | 5 |
| n-Butyl Acetate | 17.5 | 7.5 |  |  |  |  | 5 |
| Sylvares TP96 | 5 |  | 1.5 | 1.5 | 5 | 5 | 5 |
| Foral 105 |  | 2.5 |  |  |  |  |  |
| CAB 551-0.01 |  |  |  | 2 |  |  |  |
| Joncryl 680 |  |  | 2 |  |  |  |  |
| SC-30 |  |  |  |  | 2.1 |  |  |
| Lumilux Red CD 332 |  |  |  |  |  | 2.1 |  |
| Lumilux Green CD 333 |  |  |  |  |  |  | 2 |
| SC-18 | 3 | 2.1 | 2.1 | 2.1 |  |  |  |
| HM-35 | 7 | 4.9 | 4.9 | 4.9 | 4.9 | 4.9 |  |
| BYK-378 | 0.2 | 0.2 | 0.2 | 0.2 | 0.2 | 0.2 | 0.2 |
| DYNWET 800N | 1 | 1 | 1 | 1 | 1 | 1 | 1 |
| Oleic Amide | 0.6 | 0.6 | 0.6 | 0.6 | 0.6 | 0.6 | 0.6 |
|  | 100 | 100 | 100 | 100 | 100 | 100 | 100 |

| | 5-11 | 5-12 | 5-13 | 5-14 | 5-15 | 5-16 | 5-17 |
|---|---|---|---|---|---|---|---|
| Decap Performance | A | A | A | B | A | A | A |
| Dry Time | C | B | A | A | A | A | B |
| Fluorescent Glow | A | A | A | A | A | A | B |

*FIG. 5B*

INK FORMULATION FOR THERMAL INKJET PRINTING

CROSS-REFERENCE TO RELATED APPLICATIONS

The present application is a U.S. nonprovisional patent application of, and claims priority under 35 U.S.C. § 119(e) to, U.S. provisional patent application Ser. No. 63/108,752, filed Nov. 2, 2020, which '752 application is incorporated by reference herein in its entirety. A copy of the '752 application is appended hereto as Appendix A, which is also incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to formulations for inkjet printing, and, in particular, to thermal inkjet ink formulations for industrial printing applications.

Background

Inkjet printing is a computer printing technique that involves ejecting a fluid ink formulation from nozzles of a printhead onto a target substrate. Printhead nozzles are intricately designed to work with the fluid ink formulation at certain parameters including, but not limited to, parameters for viscosity, surface tension, and density.

One common form of inkjet printing is thermal inkjet (TIJ) printing, which uses a small resistor to rapidly heat a thin layer of liquid ink. A fraction of the ink is vaporized to form an expanding bubble that ejects a drop of ink from the ink cartridge onto the substrate. Thermal inkjet printing is a desirable technology for the marking and coding industry and for the mail addressing industry. Its popularity in these fields is attributable to the low cost of initial investment, ease of operation, and straight-forward maintenance requirements of thermal inkjet printing. In this regard, each thermal inkjet cartridge houses a brand new printhead (unlike competing technologies such as continuous inkjet and piezo inkjet printing methods, which may require repairs or ongoing maintenance to service installed printheads).

However, despite the benefits of thermal inkjet technology, there are challenges as well. For example, thermal inkjet inks can sometimes exhibit low optical density, short shelf life, slow drying times after printing, poor performance in decap time, and poor or weakened adhesion and layout on a variety of different non-porous low surface energy substrates. Finding an effective balance between and among these varying objectives can be a significant challenge.

Decap time has been a particularly significant concern for the marking and coding industry. "Decap" performance, as referred to herein, means the ability to perfectly print every nozzle of the print head after a prolonged idle time during which the print head is exposed to the surrounding atmosphere environment. The decap time is commonly measured by printing a test pattern using the nozzles and then reprinting the test pattern after a prolonged idle time. The longer the decap time with better intermittent printing, the longer down times are allowed for the operation without the need to maintain or service the printhead.

One known strategy that has been used to mitigate poor decap performance involves introduction of a slow-drying solvent or cosolvent to the ink formulation. For example, in U.S. Pat. No. 9,957,401 B2 to Brown, et al., it is suggested that DOWANOL® TPM (tripropylene glycol methyl ether) or DOWANOL® PM (propylene glycol methyl ether), each of which is available from Dow Chemical Company of Midland, Michigan, could be used to mitigate poor decap performance by slowing the dry time. However, less volatile solvents do not dry quickly enough for the high throughput operations of thermal inkjet printing, and the ink could smear as a result.

An alternative way to improve decap performance involves the addition of decap additives. As mentioned in U.S. Pat. No. 8,087,766 B2 to Barreto, et al., an additive with low to moderate vapor pressure (e.g., 1 to 5 mm Hg at 25° C.) and a boiling point higher than the base solvent has been introduced to an ink. This additive could be quickly removed from the printed ink, while maintaining a wet environment in the firing chamber area. However, despite improved decap performance, the adhesion of the ink is not preferred for some difficult-to-print substrates.

Another strategy to mitigate the combination of challenges presented by thermal inkjet technology involves the inclusion of tackifiers to help decap performance and adhesion. U.S. Patent Application Publication No. US 2017/0037269 A1 to Isobe and U.S. Patent Application Publication No. US 2018/0072902 A1 to Takemoto, et al. provide examples of using terpene phenol resins as tackifiers. A terpene phenol resin having a hydroxyl value of 10 to 45 mg KOH/g as the tackifier in dye-based compounding is considered to be effective. However, known uses of terpene phenol resins as tackifiers have not produced effective adhesion and layout on polyolefin substrates that have a surface comprised predominantly of hydrocarbon chains such as low density polyethylene (LDPE), linear low density polyethylene (LLDPE), or oriented polypropylene (OPP).

Thus, a need exists for a thermal inkjet ink that exhibits fast drying capability, which could be printed with satisfactory resolution and good adhesion properties on low surface energy substrates, while exhibiting effective decap performance and intermittent printing capability. This and other needs are addressed by one or more aspects of the present invention.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of thermal inkjet ink formulations for industrial printing applications, the present invention is not limited to use only in thermal inkjet ink formulations for industrial printing applications, as will become apparent from the following summaries and detailed descriptions of aspects, features, and one or more embodiments of the present invention.

Broadly defined, the present invention according to one aspect relates to a thermal inkjet ink for industrial printing applications. The thermal inkjet ink includes a base solvent that includes a short chain alcohol, a tackifier, one or more cosolvents, and a colorant.

In a feature of this aspect, the base solvent includes an alcohol or a combination of different alcohols. Contemplated alcohols as solvents include, but are not limited to, ethanol, 1-propanol (also known as n-propanol), 2-propanol (also known as isopropanol), and 1-butanol (also known as n-butanol). In another feature of this aspect, the base solvent includes ethanol. In another feature of this aspect, the base solvent includes ethanol and n-propanol.

In another feature of this aspect, the base solvent is approximately 40 wt % to approximately 95 wt % of the thermal inkjet ink. In another feature of this aspect, the base solvent is approximately 50 wt % to approximately 90 wt % of the thermal inkjet ink. In another feature of this aspect, the base solvent is approximately 60 wt % to approximately 85 wt % of the thermal inkjet ink.

In another feature of this aspect, the tackifier includes at least one type of compound selected from a group that includes terpene phenolic resins and rosin esters. In another feature of this aspect, the thermal inkjet ink may further include one or more additional resins of a polyvinyl butyral, an acrylic resin, acrylic/styrene copolymer, a polyamide resin, a polyurethane resin, a polyketone resin, a cellulose acetate butyrate resin, a copolymer of vinyl chloride and vinyl acetate, and a phenolic resin.

In another feature of this aspect, the tackifier and any additional resin are approximately 0.1 wt % to approximately 20 wt % of the thermal inkjet ink. In another feature of this aspect, the tackifier and any additional resin are approximately 1 wt % to approximately 15 wt % of the thermal inkjet ink. In another feature of this aspect, the tackifier and any additional resin are approximately 3 wt % to approximately 10 wt % of the thermal inkjet ink.

In another feature of this aspect, the one or more cosolvents include an ester. In another feature of this aspect, the ester includes one or more of methyl acetate, ethyl acetate, n-butyl acetate, and n-propyl acetate, or a combination thereof.

In another feature of this aspect, the one or more cosolvents include a ketone. In another feature of this aspect, the ketone includes one or more of acetone, methyl ethyl ketone, methyl propyl ketone, and cyclohexanone, or a combination thereof.

In another feature of this aspect, the one or more cosolvents are approximately 1 wt % to approximately 30 wt % of the thermal inkjet ink. In another feature of this aspect, the one or more cosolvents are approximately 3 wt % to approximately 25 wt % of the thermal inkjet ink. In another feature of this aspect, the one or more cosolvents are approximately 5 wt % to approximately 15 wt % of the thermal inkjet ink.

In another feature of this aspect, the colorant includes a pigment. In another feature of this aspect, the colorant includes a dye.

In another feature of this aspect, the colorant is approximately 0.1 wt % to approximately 15 wt % of the thermal inkjet ink. In another feature of this aspect, the colorant is approximately 1 wt % to approximately 12 wt % of the thermal inkjet ink. In another feature of this aspect, the colorant is approximately 5 wt % to approximately 10 wt % of the thermal inkjet ink.

In another feature of this aspect, the thermal inkjet ink further includes one or more surfactants. In another feature of this aspect, the one or more surfactants include a fluorine-based surfactant. In another feature of this aspect, the one or more surfactants include a silicone-based surfactant. In another feature of this aspect, the one or more surfactants includes an alkoxylated surfactant.

In another feature of this aspect, the one or more surfactants are approximately 0.1 wt % to approximately 5 wt % of the thermal inkjet ink. In another feature of this aspect, the one or more surfactants are approximately 0.5 wt % to approximately 4 wt % of the thermal inkjet ink. In another feature of this aspect, the one or more surfactants are approximately 1 wt % to approximately 3 wt % of the thermal inkjet ink.

In another feature of this aspect, the thermal inkjet ink further includes a lubricant. In another feature of this aspect, the lubricant includes an amino alcohol. In another feature of this aspect, the lubricant includes a fatty acid amide. In another feature of this aspect, the lubricant includes a phosphate ester.

In another feature of this aspect, the lubricant is approximately 0.1 wt % to approximately 4 wt % of the thermal inkjet ink. In another feature of this aspect, the lubricant is approximately 0.5 wt % to approximately 3 wt % of the thermal inkjet ink.

In another feature of this aspect, the thermal inkjet ink further includes a security taggant. In another feature of this aspect, the security taggant includes an ultraviolet security taggant. In another feature of this aspect, the security taggant includes an infrared security taggant. In another feature of this aspect, the infrared security taggant includes upconverting nanoparticles. In another feature of this aspect, the thermal inkjet ink further includes a combination of security taggants including at least two of ultraviolet taggants, infrared taggants, and upconverting nanoparticles.

In another feature of this aspect, the security taggant is approximately 0.1 wt % to approximately 20 wt % of the thermal inkjet ink. In another feature of this aspect, the security taggant is approximately 0.5 wt % to approximately 10 wt % of the thermal inkjet ink.

Broadly defined, the present invention according to another aspect relates to a thermal inkjet ink for industrial printing applications. The thermal inkjet ink includes a base solvent that includes one or more short chain alcohols, a terpene phenolic resin, one or more cosolvents, and a colorant. The one or more short chain alcohols of the base solvent are selected from a group that includes ethanol, 1-propanol, 2-propanol, and 1-butanol. The terpene phenolic resin is approximately 0.1 wt % to approximately 20 wt % of the thermal inkjet ink. The one or more cosolvents are selected from a group that includes esters and ketones, and the one or more cosolvents are approximately 1 wt % to approximately 30 wt % of the thermal inkjet ink. The colorant is selected from a group that includes pigments and dyes, and the colorant is approximately 0.1 wt % to approximately 15 wt % of the thermal inkjet ink.

In a feature of this aspect, the terpene phenolic resin is approximately 1 wt % to approximately 15 wt % of the thermal inkjet ink. In another feature of this aspect, the terpene phenolic resin is approximately 3 wt % to approximately 10 wt % of the thermal inkjet ink.

In another feature of this aspect, the thermal inkjet ink further includes one or more tackifiers or resins selected from the group that includes a polyvinyl butyral resin, an acrylic resin, an acrylic/styrene copolymer, a polyamide resin, a polyurethane resin, a polyketone resin, a cellulose acetate butyrate resin, a copolymer of vinyl chloride and vinyl acetate, a rosin ester, and a phenolic resin.

In another feature of this aspect, the one or more cosolvents are approximately 3 wt % to approximately 25 wt % of the thermal inkjet ink. In another feature of this aspect, the one or more cosolvents are approximately 5 wt % to approximately 15 wt % of the thermal inkjet ink.

In another feature of this aspect, the one or more cosolvents includes one or more esters selected from a group that includes methyl acetate, ethyl acetate, n-butyl acetate, and n-propyl acetate. In another feature of this aspect, the one or more cosolvents includes one or more ketones selected from a group that includes acetone, methyl ethyl ketone, methyl propyl ketone, and cyclohexanone.

In another feature of this aspect, the colorant is approximately 1 wt % to approximately 12 wt % of the thermal inkjet ink. In another feature of this aspect, the colorant is approximately 5 wt % to approximately 10 wt % of the thermal inkjet ink.

In another feature of this aspect, the thermal inkjet ink further includes one or more surfactants selected from a group that includes fluorine-based surfactants, silicone-based surfactants, and alkoxylated surfactants, wherein the one or more surfactants are approximately 0.1 wt % to approximately 5 wt % of the thermal inkjet ink.

In another feature of this aspect, the one or more surfactants are approximately 0.5 wt % to approximately 4 wt % of the thermal inkjet ink. In another feature of this aspect, the one or more surfactants are approximately 1 wt % to approximately 3 wt % of the thermal inkjet ink.

In another feature of this aspect, the thermal inkjet ink further includes a lubricant selected from a group that includes an amino alcohol, a fatty acid amide, and a phosphate ester, wherein the lubricant is approximately 0.1 wt % to approximately 4 wt % of the thermal inkjet ink.

In another feature of this aspect, the lubricant is approximately 0.5 wt % to approximately 3 wt % of the thermal inkjet ink.

In another feature of this aspect, the thermal inkjet ink further includes a security taggant selected from a group that includes an ultraviolet security taggant, an infrared security taggant, an upconverting nanoparticle, or a combination thereof, wherein the one or more security taggants are approximately 0.1 wt % to approximately 20 wt % of the thermal inkjet ink.

In another feature of this aspect, the security taggant is approximately 0.5 wt % to approximately 10 wt % of the thermal inkjet ink.

Broadly defined, the present invention according to another aspect relates to a thermal inkjet ink for industrial printing applications substantially as shown and described.

Broadly defined, the present invention according to another aspect relates to a thermal inkjet ink for industrial printing applications, substantially as shown and described, which exhibits one or more of high optical density, enhanced layout and resolution on difficult-to-spread substrates, print capability at higher speeds, fast drying ability, enhanced decap time, enhanced intermediate printing performance, improved durability, and greater scratch resistance.

Broadly defined, the present invention according to another aspect relates to a method of preparing a thermal inkjet ink for industrial printing applications substantially as shown and described.

Broadly defined, the present invention according to another aspect relates to a thermal inkjet ink for industrial printing applications. The thermal inkjet ink includes a primary solvent, a tackifier, one or more cosolvents, and a colorant. The primary solvent includes at least a short chain alcohol. The tackifier includes a terpene phenolic resin. The one or more cosolvents include at least an ester or a ketone. The colorant includes a pigment, a dye, or a combination thereof.

In a feature of this aspect, the short chain alcohol includes one or more of ethanol, 1-propanol, 2-propanol, and 1-butanol. In another feature of this aspect, the primary solvent is approximately 50 wt % to approximately 90 wt % of the thermal inkjet ink.

In another feature of this aspect, the tackifier further includes one or more additional compounds selected from a group that includes a rosin ester, a polyvinyl butyral resin, an acrylic/styrene copolymer, an acrylic resin, a polyamide resin, a polyurethane resin, a polyketone resin, a cellulose acetate butyrate resin, a copolymer of vinyl chloride and vinyl acetate, and a phenolic resin. In another feature of this aspect, the tackifier is approximately 1 wt % to approximately 15 wt % of the thermal inkjet ink.

In another feature of this aspect, the one or more cosolvents include one or more esters selected from a group that includes methyl acetate, ethyl acetate, n-butyl acetate, and n-propyl acetate. In another feature of this aspect, the one or more cosolvents include one or more ketones selected from a group that includes acetone, methyl ethyl ketone, methyl propyl ketone, and cyclohexanone. In another feature of this aspect, the one or more cosolvents are approximately 3 wt % to approximately 25 wt % of the thermal inkjet ink.

In another feature of this aspect, the colorant is approximately 1 wt % to approximately 12 wt % of the thermal inkjet ink.

In another feature of this aspect, the thermal inkjet ink further includes one or more surfactants selected from a group that includes a fluorine-based surfactant, a silicone-based surfactant, and an alkoxylated surfactant. In another feature of this aspect, the one or more surfactants are approximately 0.5 wt % to approximately 4 wt % of the thermal inkjet ink.

In another feature of this aspect, the thermal inkjet ink further includes one or more lubricants selected from a group that includes an amino alcohol, a fatty acid amide, and a phosphate ester. In another feature of this aspect, the one or more lubricants are approximately 0.1 wt % to approximately 4 wt % of the thermal inkjet ink.

In another feature of this aspect, the thermal inkjet ink further includes one or more security taggants selected from a group that includes an ultraviolet security taggant, an infrared security taggant, and upconversion nanoparticles. In another feature of this aspect, the one or more security taggants are approximately 0.1 wt % to approximately 20 wt % of the thermal inkjet ink.

Broadly defined, the present invention according to another aspect relates to a thermal inkjet ink for industrial printing applications. The thermal inkjet ink includes a primary solvent that includes at least a short chain alcohol, a tackifier that includes a terpene phenolic resin, one or more cosolvents, and a colorant. The short chain alcohol is selected from a group that includes ethanol, 1-propanol, 2-propanol, and 1-butanol. The primary solvent is approximately 40 wt % to approximately 95 wt % of the thermal inkjet ink. The tackifier further includes one or more additional compounds selected from a group that includes a rosin ester, a polyvinyl butyral resin, an acrylic/styrene copolymer, an acrylic resin, a polyamide resin, a polyurethane resin, a polyketone resin, a cellulose acetate butyrate resin, a copolymer of vinyl chloride and vinyl acetate, and a phenolic resin, the tackifier being approximately 0.1 wt % to approximately 20 wt % of the thermal inkjet ink. The one or more cosolvents include at least an ester, which is selected from a group that includes methyl acetate, ethyl acetate, n-butyl acetate, and n-propyl acetate, or, a ketone, which is selected from a group that includes acetone, methyl ethyl ketone, methyl propyl ketone, and cyclohexanone. The one or more cosolvents are approximately 0.1 wt % to approximately 30 wt % of the thermal inkjet ink. The colorant includes a pigment, a dye, or a combination thereof, and the colorant is approximately 0.1 wt % to approximately 15 wt % of the thermal inkjet ink.

In a feature of this aspect, the thermal inkjet ink further includes one or more surfactants selected from a group that includes a fluorine-based surfactant, a silicone-based surfactant, and an alkoxylated surfactant, the one or more surfactants being approximately 0.1 wt % to approximately 5 wt % of the thermal inkjet ink.

In another feature of this aspect, the thermal inkjet ink further includes one or more lubricants selected from a group that includes an amino alcohol, a fatty acid amide, and a phosphate ester, the one or more lubricants being approximately 0.1 wt % to approximately 4 wt % of the thermal inkjet ink.

In another feature of this aspect, the thermal inkjet ink further includes one or more security taggants selected from a group that includes an ultraviolet security taggant, an infrared security taggant, and upconversion nanoparticles, the one or more security taggants being approximately 0.1 wt % to approximately 20 wt % of the thermal inkjet ink.

Broadly defined, the present invention according to another aspect relates to a thermal inkjet ink for industrial printing applications. The thermal inkjet ink includes a primary solvent that includes at least a short chain alcohol, a tackifier that includes a terpene phenolic resin, one or more cosolvents, a colorant, one or more surfactants, one or more lubricants, and one or more security taggants. The primary solvent includes at least a short chain alcohol selected from a group that includes ethanol, 1-propanol, 2-propanol, and 1-butanol. The tackifier includes a terpene phenolic resin and one or more additional compounds selected from a group that includes a rosin ester, a polyvinyl butyral resin, an acrylic/styrene copolymer, an acrylic resin, a polyamide resin, a polyurethane resin, a polyketone resin, a cellulose acetate butyrate resin, a copolymer of vinyl chloride and vinyl acetate, and a phenolic resin. The one or more cosolvents include at least an ester, which is selected from a group that includes methyl acetate, ethyl acetate, n-butyl acetate, and n-propyl acetate, or, a ketone, which is selected from a group that includes acetone, methyl ethyl ketone, methyl propyl ketone, and cyclohexanone. The colorant includes a pigment, a dye, or a combination thereof. The one or more surfactants are selected from a group that includes a fluorine-based surfactant, a silicone-based surfactant, and an alkoxylated surfactant. The one or more lubricants are selected from a group that includes an amino alcohol, a fatty acid amide, and a phosphate ester.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 1 is a tabular representation of a variety of different thermal inkjet ink formulations, and collected data, in accordance with one or more aspects of the present invention;

FIG. 2 is a tabular representation of a variety of different thermal inkjet ink formulations, and collected data, in accordance with one or more aspects of the present invention;

FIGS. 3A-3C are a tabular representation of a variety of different thermal inkjet ink formulations, and collected data, in accordance with one or more aspects of the present invention;

FIGS. 4A and 4B are a tabular representation of a variety of different thermal inkjet ink formulations, and collected data, in accordance with one or more aspects of the present invention; and FIGS. 5A and 5B are a tabular representation of a variety of different thermal inkjet ink formulations, and collected data, in accordance with one or more aspects of the present invention.

DETAILED DESCRIPTION

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Furthermore, an embodiment of the invention may incorporate only one or a plurality of the aspects of the invention disclosed herein; only one or a plurality of the features disclosed herein; or combination thereof. Moreover, many embodiments, including adaptations, variations, modifications, and equivalent arrangements, are implicitly disclosed herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Further, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

A thermal inkjet ink formulation for industrial printing applications in accordance with one or more aspects of the present invention includes a primary solvent comprised of a short chain alcohol, a tackifier, one or more cosolvents, and a colorant. Ink formulations in accordance with one or more aspects of the present invention exhibit one or more of high optical density, enhanced layout and resolution on difficult-to-spread substrates, print capability at higher speeds, fast drying ability, enhanced decap time and intermediate printing, and improved durability and scratch resistance.

Primary Solvent. A primary or base solvent for a thermal inkjet ink in accordance with one or more aspects of the present invention should be selected so as to be compatible with the inkjet cartridge so that the formulation is stable and compatible within the shelf life for the ink product. Other considerations for the base solvent include, but are not limited to: the ability of the base solvent to dry quickly to fit the industrial need in the printing environment; the ability of the base solvent to form a homogenized stable solution with the help of one or more cosolvents in dissolving the tackifier, resin, and/or other additives; whether the base solvent exhibits sufficiently low viscosity to be printed out by thermal inkjet technology; and whether the base solvent exhibits sufficiently low surface tension to help facilitate low ink droplet formation.

Generally, as used herein, "primary solvent" or "base solvent" refers to a short-chain alcohol (i.e., an alcohol having a carbon chain of no more than 4 carbon atoms). Suitable base solvents for use in a thermal inkjet ink as disclosed herein include, but are not limited to, methanol, ethanol, 1-propanol (also known as n-propanol), 2-propanol (also known as isopropanol), 1-butanol (also known as n-butanol), and other short chain alcohols. Solvents having a heat of vaporization between 30 and 52 kJoules/mole exhibit appropriate jetting qualities from a thermal inkjet printhead. In a preferred embodiment, ethanol can be selected as a base solvent owing to a fast-drying property together with effective jetting capability. In another preferred embodiment, ethanol and 1-propanol can be selected as base solvents owing to a fast-drying property, effective jetting capability, and greater tackifier or resin solubilizing capability.

In some contemplated embodiments, the base solvent or solvents may be approximately 40 wt % to approximately 95 wt % of the thermal inkjet ink. In other contemplated embodiments, the base solvent or solvents may be approximately 50 wt % to approximately 90 wt % of the thermal inkjet ink. In still other contemplated embodiments, the base solvent or solvents may be approximately 60 wt % to approximately 85 wt % of the thermal inkjet ink.

Tackifier. It is contemplated that a thermal inkjet ink in accordance with one or more aspects of the present invention includes a tackifier to increase the tack of the ink at a surface thereof. In at least some contemplated embodiments, the tackifier includes a terpene phenolic resin. In other contemplated embodiments, a terpene phenolic resin, as a tackifier, is used in combination with one or more additional resins, such as, for example, one or more of a rosin ester, a polyvinyl butyral resin, an acrylic/styrene copolymer, an acrylic resin, a polyamide resin, a polyurethane resin, a polyketone resin, a cellulose acetate butyrate resin, a copolymer of vinyl chloride and vinyl acetate, and a phenolic resin.

When implemented in a thermal inkjet ink formulation, a tackifier can rapidly form a thin layer or film at the interface between ink residue on the surface of the nozzle plate of the print cartridge and the atmosphere outside of the nozzle plate. The formed layer or film over the print nozzles has a shielding effect and can significantly reduce evaporation of the solvents of the ink, as well as reduce accumulation of dried ink residues. In this manner, the formed layer or film functions as a protective shell to help preserve the ink for continued and future use. It is contemplated that formation of a thin layer or film on the nozzle plate surface is similar to the principles underlying Langmuir-Blodgett (LB) films and water interaction. The thin layer or film formed at the surface of the ink residue can be easily broken with the pressure applied via thermal bubble generation when the next ink droplet is fired or ejected from the nozzle.

The inclusion of a tackifier in the thermal inkjet ink can help the ink to achieve enhanced decap performance. The thin layer or film forms, and reforms after firing, on the surface of the nozzle opening rapidly, which allows the ink to obtain a fast-drying property. In this regard, a tackifier may help to eliminate a need for large quantities of more slowly drying solvents or cosolvents for the purpose of maintaining intermittent printing capability. Further in this regard, the effects of a tackifier in the ink formulation create the possibility of using a low vapor pressure solvent to enhance fast-drying capabilities and maintain the enhanced decap and intermediate printing performance. To establish an equilibrium in the ink formulation quickly, hydroxyl value, softening point, and glass transition point properties of the tackifier can be considered.

Some tackifiers, particularly among terpene phenolic resins and/or rosin esters, are soluble in aliphatic, aromatic and chlorinated hydrocarbons, esters, terpenes, ethyl ether, and some longer-chain alcohols, but have reduced solubility in shorter-chain alcohols, glycols and ketones. In a preferred embodiment, base solvents and cosolvents can be selected so as to provide sufficient solubility to the tackifier. In this regard, it is notable that solubility of the tackifier or tackifiers can correlate with or be dependent upon the loading of non-ethanol solvents in the thermal inkjet ink. For example, in some contemplated embodiments, the tackifier or tackifiers exhibit low solubility in ethanol and may not be soluble in ethanol at all. This is particularly true for instances where a terpene phenolic resin is selected as a tackifier. In such cases, loading of other solvents, such as n-propanol and/or other solvents noted hereinabove, influence how much tackifier or tackifiers can be dissolved in the thermal inkjet ink. Solubility of the tackifier or tackifiers is understood to be attributable at least in part to the type of tackifier or resin selected as well as the hydroxyl value of the selected tackifier or resin selected, where the hydroxyl value is a measure of the content of free hydroxyl (—OH) groups in the substance.

Ascertaining an effective balance between tackifier content relative to non-ethanol solvents capable of dissolving the tackifier or tackifiers (potentially including any cosolvents, as discussed in greater detail below) is understood to impact decap performance as well as adhesion of the thermal inkjet ink on a variety of substrates. In some contemplated embodiments, an effective ratio of tackifier or tackifiers relative to non-ethanol solvents in a thermal inkjet ink can be found close to or at a solubility limit allowed by the solvent(s). When close to a maximum amount of tackifier or tackifiers is dissolved in the non-ethanol solvents, the thermal inkjet ink exhibits desirable attributes of enhanced decap performance and adhesiveness. Tackifier loading beneath this ratio may not provide the same comparative enhancements, and tackifier loading above this ratio may cause the tackifier to precipitate and/or cause poor decap performance or kogation.

In a contemplated embodiment utilizing a terpene phenolic resin, alone, as a tackifier, the terpene phenolic resin can be loaded at a ratio of approximately 1 part tackifier to approximately 3.7 parts non-ethanol solvent (approximately 5 wt % tackifier and approximately 18.5 wt % non-ethanol solvents in the thermal inkjet jet). In a contemplated embodiment utilizing a rosin ester, alone, as a tackifier, the rosin ester can be loaded at a ratio of approximately 1 part tackifier to approximately 7.4 parts non-ethanol solvent (approximately 2.5 wt % tackifier and approximately 18.5 wt % non-ethanol solvents in the thermal inkjet jet). In a contemplated embodiment utilizing both a terpene phenolic resin and a rosin ester as tackifiers, the tackifiers are loaded at a ratio of approximately 1 part tackifier to approximately 6 parts non-ethanol solvent (approximately 3.25 wt % tackifiers and approximately 20 wt % non-ethanol solvents in the thermal inkjet jet). In at least some embodiments, non-ethanol base solvents and/or cosolvents used to dissolve the tackifier or tackifiers in a thermal inkjet ink may include n-propanol, n-butanol, acetone, cyclohexanone, or others as discussed herein.

In contemplated embodiments, a thermal inkjet ink as disclosed herein does not contain water in the formulation. A tackifier could interact with water and result in an instable solution where the tackifier crashes out of the system (e.g., precipitate a solid from the liquid formulation). In such cases, the thermal inkjet printhead could become clogged, thus having a negative impact upon printing performance.

Contemplated terpene phenolic resins for use as a tackifier with a thermal inkjet ink in accordance with one or more aspects of the present invention include, but are not limited to: SP-553 RESIN, which is available from Akrochem Corporation of Akron, Ohio; Dertophene® T, Dertophene® T105, and Dertophene® T115, each of which is available from Pinova, Inc. of Brunswick, Georgia; SYLVARES™ TP 96, SYLVARES™ TP 300, SYLVARES™ TP2019, and SYLVARES™ 1095, each of which is available from Kraton Corporation of Houston, Texas; and DRT-70, DRT-90 and DRT-100, each of which is available from Mangalam Organics Ltd. of Mumbai, India.

In at least some contemplated embodiments, a terpene phenolic resin is used as a singular tackifier or resin in the thermal inkjet ink (i.e., without any other tackifier or resin used in addition to the terpene phenolic resin). In such cases, a terpene phenolic resin as the lone tackifier compound can achieve enhanced decap performance in addition to strong adhesion to most plastic substrates. When utilized as the only tackifier compound in the thermal inkjet ink, it is contemplated that a terpene phenolic resin can be loaded at approximately 4 wt % to approximately 5 wt % of the thermal inkjet ink. Higher solubility of a terpene phenolic resin can be attributed in part to a high hydroxyl value for a terpene phenolic resin. With greater solubility, a terpene phenolic resin can be loaded in greater quantities while still being capable of adherence to many low surface energy substrates without the presence of any other tackifier or resin.

Other advantages to using a terpene phenolic resin as the lone tackifier in a thermal inkjet ink are understood. For example, when loaded at sufficiently high levels (such as close to or at a solubility limit of the solvent(s)), a terpene phenolic resin can help to enhance desirable decap performance of the thermal inkjet ink while simultaneously achieving strong adhesion and printability to low surface energy substrates (without requiring another resin or tackifier compound to separately enhance adhesion). These enhanced performance attributes can be accomplished across a wide range of environmental conditions, including at low or high humidity levels and at low or high temperature levels. Additionally, by using a terpene phenolic resin as the lone tackifier in a thermal inkjet ink, unintended interactions between and among multiple tackifier compounds and/or resins can be avoided. Unintended interactions between and among tackifiers and additional resins are often complex and may impart the thermal inkjet ink with practical limitations such as moisture or temperature sensitivity (e.g., using a terpene phenolic resin as a tackifier and a phenolic resin may cause a thermal inkjet ink to exhibit insufficient decap performance and/or loss of nozzles in more humid environments). Still further, utilization of other tackifier compounds in combination with a terpene phenolic resin as the tackifier may have a negative impact on other attributes of a thermal inkjet ink, such as ejection stability, storage stability, poor substrate wetting, and inadequate solubility.

In certain other contemplated embodiments, additional tackifier or resin compounds may be utilized in addition to a terpene phenolic resin as a tackifier in order to achieve a particular attribute or objective for a thermal inkjet ink or to enhance printability and adhesion to a particular substrate. In such cases, thermal inkjet inks in accordance with one or more aspects of the present invention may also contain selected additional tackifier or resin compounds to promote one or more of decap performance, adhesion performance (i.e., better adhesion to a specific substrate), or scratch resistance. When a terpene phenolic resin is utilized in combination with additional tackifier or resin compounds in a thermal inkjet ink, it is contemplated that the terpene phenolic resin can be loaded at approximately 1 wt % to approximately 2 wt % of the thermal inkjet ink. In such cases, it is contemplated that the additional tackifier or resin can be loaded at approximately 1.5 wt % to approximately 2.5% of the thermal inkjet ink. With lower loading of a terpene phenolic resin, it is contemplated that a similarly soluble additional tackifier or resin can be utilized to "occupy" some or all of the remaining solubility space provided by the selected solvents (approaching or at a solubility limit of the solvent(s)). In this regard, a thermal inkjet ink utilizing a terpene phenolic resin in combination with one or more additional tackifiers or resins can achieve comparable enhanced decap performance while simultaneously exhibiting enhanced adhesion to certain kinds of substrates.

Contemplated additional or alternative tackifiers include, but are not limited to: one or more rosin esters such as, for example, 8LJA or SE10, each of which is available from Harima Chemicals Group, Inc. of Tokyo, Japan; FILTREZ™ 530 or FILTREZ™ 531, each of which is available from Lawter Inc. of Chicago, Illinois; SYLVALITE™ RE100L, which is available from Kraton Corporation of Houston, Texas; Pensel D-125, which is available from Arakawa Chemical Industries, Ltd. of Osaka, Japan; or Foral 85™ or Foral 105™, each of which is available from Eastman Chemical Company of Kingsport, Tennessee.

Contemplated additional resins include, but are not limited to: (A) a polyvinyl butyral (PVB) resin such as, for example, Mowital B16 H, Mowital B30 T, Mowital B45 M, or Mowital B60 HH, each of which is available from Kuraray America, Inc. of Fort Mill, South Carolina; or, BUTVAR® B-72, which is available from Eastman Chemical Company of Kingsport, Tennessee; (B) an acrylic resin such as, for example, JONCRYL® 586, JONCRYL® 611, JONCRYL® 678, JONCRYL® 680, JONCRYL® 683, JONCRYL® 690, or JONCRYL® 693, each of which is available from BASF Corporation of Florham Park, New Jersey; or, (C) an acrylic/styrene copolymer such as, for example, NEOCRYL® B-818 or NEOCRYL® B-819, each of which is available from DSM Coating Resins B. V. of Zwolle, the Netherlands; (D) a polyamide resin such as, for example, UNI-REZ 110, UNI-REZ 2215, or UNI-REZ 2221, each of which is available from Kraton Corporation of Houston, Texas; (E) a polyurethane resin such as, for example, VERSAMID® PUR 1010 or VERSAMID® PUR 1011, each of which is available from BASF Corporation of Florham Park, New Jersey; or, KFILM™ 8686, which is available from Kane International Corporation of Rye, New York; (F) a polyketone resin such as, for example, REACTOL™ 1717E, which is available from Lawter Inc. of Chicago, Illinois; or, Ketonic Resin HK-100, which is available from Vivify Company of Glendale Heights, Illinois; (G) a cellulose acetate butyrate resin such as, for example, CAB-551-0.01 or CAB-553-0.4, each of which is available from Eastman Chemical Company of Kingsport, Tennessee; (H) a copolymer of vinyl chloride and vinyl acetate such as, for example, VINNOL® E 15/45 or VINNOL® H 14/36, each of which is available from Wacker Chemie AG of Munich, Germany; or (I) a phenolic resin such as, for example, Phenolite TD-2090, Phenolite TD-2093, Phenolite TD-2106, and Phenolite TD-2131, each of which is available from DIC Corporation of Tokyo, Japan; or, REACTOL™ 1111A, which is available from Lawter Inc. of Chicago, Illinois.

It is contemplated that a terpene phenolic resin as a tackifier, together with an additional tackifier or resin as discussed hereinabove, not only enhances decap performance of the thermal inkjet ink, but also promotes adhesion of the ink onto substrates. Examples of substrates that exhibit enhanced adhesion include, but are not limited to, polyethylene (PE), low density polyethylene (LDPE), linear low density polyethylene (LLDPE), high density polyethylene (HDPE), polypropylene (PP), oriented polypropylene (OPP), biaxially oriented polypropylene (BOPP), cyclic olefin copolymer (COC), cyclic olefin polymer (COP), glass, and aluminum foil. In the coding and marking industry, thermal inkjet inks are commonly applied to or printed on pre-existing prints that have been printed by flexographic, lithographic, or screen printing technology.

In some contemplated embodiments, a total sum of tackifier and/or resin may be approximately 0.1 wt % to approximately 20 wt % of the thermal inkjet ink. In other contemplated embodiments, a total sum of tackifier and/or resin may be approximately 1 wt % to approximately 15 wt % of the thermal inkjet ink. In still other contemplated embodiments, a total sum of tackifier and/or resin may be approximately 3 wt % to approximately 10 wt % of the thermal inkjet ink.

Cosolvent(s). It is contemplated that a thermal inkjet ink in accordance with one or more aspects of the present invention includes one or more cosolvents. In particular, it is contemplated that selected cosolvents may include esters or ketones.

Esters and ketones are understood generally to have low compatibility with thermal inkjet ink cartridges as a primary or base solvent. This is due at least in part to structural attributes of the material used in the print cartridge, but effects of the presence of esters and ketones at higher concentrations is understood to affect long term compatibility of the formulation and shelf life. However, any concerns over the use of esters or ketones are mitigated or substantially eliminated when they are implemented in a formulation as a non-primary solvent or cosolvent. When used as a cosolvent in the thermal inkjet ink formulation, the loading of esters or ketones in the overall formulation can be relatively low to help mitigate concerns, while still contributing beneficial properties to the formulation.

As cosolvents, esters or ketones can impart the ink formulation with additional attributes. It is contemplated that cosolvents can enhance adhesion of the thermal inkjet ink to a substrate. In particular, when one or more ketones are included as a cosolvent in the formulation, the thermal inkjet ink can exhibit more effective penetration of non-absorptive substrates. In this regard, inclusion of one or more cosolvents helps with abrasion resistance and adhesion attributes of the thermal inkjet ink.

It is further contemplated that cosolvents can facilitate or enhance decap performance of the thermal inkjet ink. In particular, introduction of a moderate vapor pressure cosolvent to the ink formulation can slow the evaporation rate of the thermal inkjet ink by a sufficient margin to allow the tackifier sufficient time to form a protective thin layer or film on the nozzle plate of the inkjet cartridge. In this regard, one or more cosolvents in the ink formulation function as a safeguard to help maintain enhanced decap performance of the thermal inkjet ink.

Contemplated ketone cosolvents for use with a thermal inkjet ink in accordance with one or more aspects of the present invention include, but are not limited to, acetone, methyl ethyl ketone (MEK), methyl propyl ketone (MPK), and cyclohexanone. Contemplated ester cosolvents for use with a thermal inkjet ink in accordance with one or more aspects of the present invention include, but are not limited to, methyl acetate, ethyl acetate, n-butyl acetate, and n-propyl acetate.

In some contemplated embodiments, one or more cosolvents may be approximately 0.1 wt % to approximately 30 wt % of the thermal inkjet ink. In other contemplated embodiments, one or more cosolvents may be approximately 3 wt % to approximately 25 wt % of the thermal inkjet ink. In still other contemplated embodiments, one or more cosolvents may be approximately 5 wt % to approximately 15 wt % of the thermal inkjet ink.

Colorant. It is contemplated that a thermal inkjet ink in accordance with one or more aspects of the present invention includes one or more colorants. Colorants may include one or more pigments, one or more dyes, or combinations or mixtures of the foregoing.

Pigments are finely ground particles of colorant that can be suspended in a medium. Suitable pigments for use as a colorant in a thermal inkjet ink in accordance with one or more aspects of the present invention include, but are not limited to, Pigment Black 7, Pigment Blue 15:3, Pigment Blue 15:4, Pigment Red 122, Pigment Violet 19, Pigment Yellow 139, Pigment Yellow 150, Pigment Yellow 155, Pigment Green 7, Pigment Violet 23, Pigment Orange 64, and Pigment White 6. Commercially available pigments for use as a colorant for a thermal inkjet ink in accordance with one or more aspects of the present invention include, but are not limited to, PALIOTOL® Yellow D 1115 J, CROMOPHTAL® Orange D 2961, CINQUASIA® Red L 4105HD, HELIOGEN® Green D 8730, each of which is available from BASF Corporation of Florham Park, New Jersey, and Ink Jet Yellow 4G, Inkjet Magenta E 02, HOSTAPERM® Blue BT-617-D, each of which is available from Clariant AG of Muttenz, Switzerland.

Dyes are chemical colorants that can be dissolved in a medium to form a paint, ink, or other coloring agent. To avoid forming a settlement, dye colorants should be completely dissolved in the solvent and any cosolvents to form a homogenous liquid. Suitable dye colors include, but are not limited to, black, cyan, magenta, yellow, red, orange, purple, and green.

It is contemplated that dyes for use as colorants in a thermal inkjet ink in accordance with one or more aspects of the present invention can exist as powders or liquids. Suitable commercially available powder dyes include, but are not limited to, ORASOL® X55, NEPTUN® Yellow 075, ORASOL® Yellow 152, ORASOL® Orange 251, and ORASOL® Blue 855, each of which is available from BASF Corporation of Florham Park, New Jersey, and VALIFAST® Black 3808, VALIFAST® Black 3830, VALIFAST® Blue 2620, VALIFAST® Brown 2402, each of which is available from Orient Corporation of Tokyo, Japan. Suitable commercially available liquid dyes include, but are not limited to, MORFAST® Black 101, MORFAST® Black 108, MORFAST® Brown 100, MORFAST® Blue 104, MORFAST® Red 101, MORFAST® Yellow 102 available from Sunbelt Corporation of Rock Hill, South Carolina.

In some contemplated embodiments, one or more colorants may be approximately 0.1 wt % to approximately 15 wt % of the thermal inkjet ink. In other contemplated embodiments, one or more colorants may be approximately 1 wt % to approximately 12 wt % of the thermal inkjet ink. In still other contemplated embodiments, one or more colorants may be approximately 5 wt % to approximately 10 wt % of the thermal inkjet ink.

Surfactant(s). In at least some contemplated embodiments, a thermal inkjet ink in accordance with one or more aspects of the present invention further includes one or more surfactants.

Surfactants can be used in thermal inkjet ink formulations to reduce the surface tension of the ink, which helps the ink have the ability to spread on a substrate. In particular, it is contemplated that one or more surfactants can be used to reduce the droplet contact angle and layout of a thermal inkjet ink with respect to a variety of different substrates. In this regard, optical density may be a direct reflection of the coalescence effect on a difficult-to-wet substrate. Lower surface tension may improve substrate wetting to create a high-slip and anti-crater effect on very low surface energy substrates, which are widely used in the coding and marking industry.

Effects of the surfactants in a thermal inkjet ink are not limited to improved substrate wetting. Inclusion of one or more surfactants in the thermal inkjet ink may help to control the trajectory of ink droplets. This is particularly true at higher print speeds in industrial printing applications. It is contemplated that a combination of surfactants may be used to accomplish the desired performance.

It is contemplated that surfactants for use in a solvent-based thermal inkjet ink in accordance with one or more aspects of the present invention include fluorine-based surfactants, silicone-based surfactants, and alkoxylated surfactants. It is contemplated that fluorine-based surfactants could be either ionic or nonionic. It is contemplated that silicone-based surfactants may include copolymers of silicone and polyethers, and/or polyacrylates. It is contemplated that alkoxylated surfactants can be ethoxylated or alkoxylated compounds or alcohols.

Suitable commercially available fluorine-based surfactants include, but are not limited to, Capstone™ FS-22 and Capstone™ FS-3100 from The Chemours Company of Wilmington, Delaware.

Various silicone-based surfactants capable of use in a thermal inkjet ink in accordance with one or more aspects of the present invention exhibit different structural characteristics, such as length of the siloxane backbone of the molecules and, by extension, the molecular weight. Suitable commercially available silicone-based surfactants that exhibit high molecular weight and a long polydimethylsiloxane (PDMS) backbone include, but are not limited to, TEGO® Glide 410, TEGO® Glide 432, and TEGO® Rad 2300, each of which is available from Evonik Industries of Essen, Germany. Suitable commercially available silicone-based surfactants that exhibit low molecular weight and a short siloxane backbone include, but are not limited to, Gemini siloxanes such as TEGO® TWIN 4100 and TEGO® WET 240, each of which is available from Evonik Industries of Essen, Germany. Suitable commercially available silicone-based surfactants that exhibit low molecular weight and include branched alcohol polyethers include, but are not limited to, TEGO® Wet 500, which is available from Evonik Industries of Essen, Germany. Other suitable commercially available silicone-based surfactants include, but are not limited to, BYK-333, BYK-348, BYK-377, BYK-378, BYK-3550, and BYK-3760, each of which is available from BYK USA Inc. of Wallingford, Connecticut.

Suitable commercially available alkoxylated surfactants include, but are not limited to, BYK-DYNWET-800N, which is available from BYK USA Inc. of Wallingford, Connecticut; TERGITOL™ 15-S-7, which is available from Dow Chemical Company of Midland, Michigan; and Surfynol® 440 and Surfynol® 465, each of which is available from Evonik Industries of Essen, Germany.

In some contemplated embodiments, one or more surfactants may be approximately 0.1 wt % to approximately 5 wt % of the thermal inkjet ink. In other contemplated embodiments, one or more surfactants may be approximately 0.5 wt % to approximately 4 wt % of the thermal inkjet ink. In still other contemplated embodiments, one or more surfactants may be approximately 1 wt % to approximately 3 wt % of the thermal inkjet ink.

Lubricant. In at least some contemplated embodiments, a thermal inkjet ink in accordance with one or more aspects of the present invention further includes one or more lubricants. It is contemplated that the inclusion of one or more lubricants can improve tape resistance and scratch resistance of print substrates and also help the firing motion of the thermal inkjet printing process to reduce the occurrence of satellites at higher printing speeds.

In the field of inkjet printing, "satellites" are small ink droplets that are unintentionally formed during the jetting process when ink is ejected from the cartridge nozzle plate. Satellites have the practical effect of degrading the quality of a printed product, text, code, or image. As mentioned hereinabove, surfactants can limit the coalescence of ink on low surface tension substrates. However, in at least some cases, surfactants may also cause satellites to form during the jetting process at higher printing speeds where inkjet nozzles are required to fire at higher frequencies. It is contemplated that the presence of one or more lubricants in the thermal inkjet ink formulation can help mitigate any negative performance of the ink arising from satellite formation. In particular, one or more lubricants can facilitate smoother nozzle functionality at high printing speeds to lessen satellite formation on the substrate.

Contemplated lubricants for use with a thermal inkjet ink in accordance with one or more aspects of the present invention include, but are not limited to, amino alcohols and fatty acid amides, and phosphate esters. Amino alcohols (also known as alkanolamines) are organic compounds that contain both an amine (—NH2, —NHR, or —NR) and an alcohol functional group. Amino alcohols, fatty acid amides, and phosphate esters are each understood to exhibit good solubility in ethanol or short chain alcohols. Suitable commercially available amino alcohols include, but are not limited to, ethanolamine, N,N-dimethylethanolamine (DMEA), N-methyldiethanolamine (MDEA), triethanolamine (TEA), N,N-dimethylpropanolamine (DMPA), and 2-amino-2-methyl-1-propanol. Suitable commercially available fatty acid amides include, but are not limited to, stearic amide, linoleic amide, and oleic amide. Suitable commercially available phosphate esters include, but are not limited to, Crodafos™ 03A, Crodafos™ HCE, and Crodafos™ T6A, each of which is available from Croda Inc. of Princeton, New Jersey; and Dispersogen® LFH, which is available from Clariant AG of Muttenz, Switzerland.

In some contemplated embodiments, one or more lubricants may be approximately 0.1 wt % to approximately 4 wt % of the thermal inkjet ink. In other contemplated embodiments, one or more lubricants may be approximately 0.5 wt % to approximately 3 wt % of the thermal inkjet ink.

Security taggant. In at least some contemplated embodiments, a thermal inkjet ink in accordance with one or more aspects of the present invention further includes one or more security taggants. A security taggant can provide the thermal inkjet ink with a security feature to help protect print packaging and coding materials against fraud or counterfeiting. Contemplated security ink applications using a thermal inkjet ink in accordance with one or more aspects of the present invention include, but are not limited to, ultraviolet (UV) fluorescent inks and infrared (IR) fluorescent inks.

A security taggant to include in the thermal inkjet ink can be selected to impart the ink with the desired security feature. In at least some embodiments, a security taggant includes a UV marker, IR marker, or upconverting nanoparticle. In such cases, it is contemplated that the thermal inkjet ink may be invisible or transparent under the visible light spectrum but can exhibit an identifying characteristic under certain detectors (e.g., exhibiting a fluorescent effect under ultraviolet light for a UV fluorescent marker). In other such cases, it is contemplated that the thermal inkjet ink may be visible under the visible light spectrum but additionally exhibit an identifying characteristic under certain detectors.

In cases where the thermal inkjet ink includes a UV fluorescent marker or taggant, it is contemplated that the ink may be detectable by exposing the printed substrate to light having a wavelength of approximately 365 nm to approximately 395 nm. Suitable commercially available UV security taggants include fluorescent dyes and optical brighteners that include, but are not limited to: D-211, D-286, D-298, HM-11, HM-14, HMS-30, and HM-35, each of which is available from DayGlo Color Corporation of Cleveland, Ohio; SC-4, SC-5, SC-11, SC-17, SC-18, SC-25, SC-27, and SC-30, each of which is available from Angstrom Technologies, Inc. of Florence, Kentucky; LUMILUX® Blue CD 307, LUMILUX® Red CD 332, and LUMILUX® Green CD 333, each of which is available from Honeywell International Inc. of Charlotte, North Carolina; and RC-B, which is available from Bio Accutech Inc. of West Windsor, New Jersey.

In cases where the thermal inkjet ink includes an IR fluorescent marker or taggant, it is contemplated that the ink may fluoresce as a result of a Stokes shift, which is a spectral shift to lower energy between incident light and light that is scattered or emitted following interaction with the substrate. In this regard, the IR fluorescent taggant converts shorter wavelength light into a longer wavelength photon after absorbing a shorter wavelength photon. This effect could be accomplished, for example, by including upconversion nanoparticles as a security taggant. Suitable upconversion nanoparticles include, but are not limited to NaYF4:Yb,Tm, NaYF4:Yb,Nd, and NaYF4:Yb,Nd. In other contemplated embodiments, suitable upconversion nanoparticles include, but are not limited to, iodide dye, copper phthalocyanine dye, and cobalt phthalocyanine dye.

In some contemplated embodiments, one or more security taggants may be approximately 0.1 wt % to approximately 20 wt % of the thermal inkjet ink. In other contemplated embodiments, one or more security taggants may be approximately 0.5 wt % to approximately 10 wt % of the thermal inkjet ink.

Other Components. It is contemplated that a thermal inkjet ink in accordance with one or more aspects of the present invention can include any of a variety of other components to help achieve a desired print effect or attribute. Contemplated other components include, but are not limited to, additional resins, surfactants, or lubricants, as well as pH adjusting additives, chelating agents, or biocides. In many cases, inclusion of one or more additional components can enhance performance capabilities of the thermal inkjet ink.

Examples

EXAMPLE 1. It is contemplated that a thermal inkjet ink in accordance with one or more aspects of the present invention can be manufactured by any suitable technique. In this regard, FIG. 1 is a tabular representation of a variety of different thermal inkjet ink formulations, and collected data, in accordance with one or more aspects of the present invention. In particular, FIG. 1 sets forth formulations for Samples 1-1 through 1-7.

Components of each contemplated ink formulation are set forth in FIG. 1 by weight percentage (for a total of 100%). Components of each formulation were mixed together and stirred until reaching a homogenous state. Following mixing, each ink formulation was filtered using a 1 µm absolute filter to create the thermal inkjet ink.

Print substrates included polyvinyl chloride (PVC), polyethylene terephthalate (PET), biaxially-oriented polypropylene (BOPP), coated polyethylene (PE) film, and aluminum foil. All printing was conducted using a NetJet inkjet printing system manufactured by Kirk-Rudy, Inc. of Woodstock, Georgia with a HP45 thermal inkjet system supplied by HP Inc. of Palo Alto, California. Images were printed with 600*300 dots per inch (DPI) at 150 ft/min without any pulse warming on the print substrates. Printed images were consistent with a QR code, a barcode, a nozzle check pattern, and a solid square with font size 12. The printed ink samples were evaluated for dry time, decap time, and barcode readability.

Decap Time Evaluation: Decap time was measured by ascertaining the number of nozzles that correctly fired when printed 30 minutes following an initial test print. A nozzle check test pattern was printed initially to ensure that every nozzle was printing correctly before the test. Following the initial test, the print cartridge was retained in the cartridge holder for 30 minutes. At the conclusion of the 30-minute wait time, the nozzle check test pattern was printed five times. Decap time grades were assigned as follows: if more than five nozzles missed for the final print, a "C" grade was assigned; if the number of nozzles that missed for the final print was between one and five, a "B" grade was assigned; and if no nozzles missed for the final print, an "A" grade was assigned.

Dry Time Evaluation. Dry time was measured by press and movement of a thumb with gentle force on the printed QR code following a certain time after printing. Dry time grades were assigned as follows: if the ink still smears after 5 seconds from printing, a "C" grade was assigned; if dry time measured between 2 and 5 seconds from printing, a "B" grade was assigned; and if the ink was dry within 2 seconds from printing, then an "A" grade was assigned.

Barcode Readability: Barcode readability was measured by barcode verifier Axicon 6015, which is available from Axicon Auto ID Limited of Oxfordshire, United Kingdom. The results of the measurements were used to assign each printed barcode a grade. The American National Standards Institute (ANSI) standard for barcode readability was developed using alphabetic grading from A through D and then F.

An "A" grade is the best result, a C "grade" is required for a barcode to receive a "pass" grade, and a grade of "D" or "F" is considered as a "fail" grade.

As seen in FIG. 1, Sample 1-1 showed DOWANOL® PM significantly slowed the drying time for the thermal inkjet ink even with relatively small loading. Additionally, fluorine-based surfactants performed well for satellites performance, and the inks showed acceptable decap performance.

EXAMPLE 2. FIG. 2 is a tabular representation of a variety of different thermal inkjet ink formulations, and collected data, in accordance with one or more aspects of the present invention. In particular, FIG. 2 sets forth formulations for Samples 2-1 through 2-7. FIG. 2 includes ink formulations that include an alkoxylated surfactant and a silicone-based surfactant with a varying resin package. Additionally, FIG. 2 includes ink formulations that include a black dye to create a black ink.

Components of each contemplated ink formulation are set forth in FIG. 2 by weight percentage (for a total of 100%). Components of each formulation were mixed together and stirred until reaching a homogenous state. Following mixing, each ink formulation was filtered using a 1 µm absolute filter to create the thermal inkjet ink.

Print substrates included polyvinyl chloride (PVC), polyethylene terephthalate (PET), biaxially-oriented polypropylene (BOPP), coated polyethylene (PE) film, and aluminum foil. All printing was conducted using a NetJet inkjet printing system manufactured by Kirk-Rudy, Inc. of Woodstock, Georgia with a HP45 thermal inkjet system supplied by HP Inc. of Palo Alto, California. Images were printed with 600*300 dots per inch (DPI) at 150 ft/min without any pulse warming on the print substrates. Printed images were consistent with a QR code, a barcode, a nozzle check pattern, and a solid square with font size 12. The printed ink samples were evaluated for optical density, dry time, decap time, and barcode readability.

Optical Density. Optical density was measured with an exact Advanced spectrophotometer (SN: 00Z518; aperture: 4.0 mm; ISO Status "T" density with MO lighting source), which is available from Pantone LLC of Carlstadt, New Jersey. Optical density grades were assigned as follows: if the measured optical density was under 1.7, a "C" grade was assigned; if the measured optical density was between 1.7 and 2.0, a "B" grade was assigned; and if the measured optical density was higher than 2.0, an "A" grade was assigned.

Decap Time Evaluation: Decap time was measured by ascertaining the number of nozzles that correctly fired when printed 30 minutes following an initial test print. A nozzle check test pattern was printed initially to ensure that every nozzle was printing correctly before the test. Following the initial test, the print cartridge was retained in the cartridge holder for 30 minutes. At the conclusion of the 30-minute wait time, the nozzle check test pattern was printed five times. Decap time grades were assigned as follows: if more than five nozzles missed for the final print, a "C" grade was assigned; if the number of nozzles that missed for the final print was between one and five, a "B" grade was assigned; and if no nozzles missed for the final print, an "A" grade was assigned.

Dry Time Evaluation. Dry time was measured by press and movement of a thumb with gentle force on the printed QR code following a certain time after printing. Dry time grades were assigned as follows: if the ink still smears after 5 seconds from printing, a "C" grade was assigned; if dry time measured between 2 and 5 seconds from printing, a "B"

grade was assigned; and if the ink was dry within 2 seconds from printing, then an "A" grade was assigned.

Barcode Readability: Barcode readability was measured by barcode verifier Axicon 6015, which is available from Axicon Auto ID Limited of Oxfordshire, United Kingdom. The results of the measurements were used to assign each printed barcode a grade. The American National Standards Institute (ANSI) standard for barcode readability was developed using alphabetic grading from A through D and then F. An "A" grade is the best result, a C "grade" is required for a barcode to receive a "pass" grade, and a grade of "D" or "F" is considered as a "fail" grade.

As shown in FIG. 2, the inclusion of acetone enhances the drying speed and optical density of the thermal inkjet inks. Additionally, the impact of co-resins used on adhesion performance and decap performance is less significant as compared to samples with just tackifier alone.

EXAMPLE 3. FIGS. 3A-3C are a tabular representation of a variety of different thermal inkjet ink formulations, and collected data, in accordance with one or more aspects of the present invention. In particular, FIGS. 3A-3C set forth formulations for Samples 3-1 through 3-20. FIGS. 3A-3C include ink formulations that utilize different terpene phenolic resins and rosin esters as tackifiers, as well as various surfactant and lubricant types and combinations. Additionally, FIGS. 3A-3C include ink formulations that include a black dye to create a black ink.

Components of each contemplated ink formulation are set forth in FIGS. 3A-3C by weight percentage (for a total of 100%). Components of each formulation were mixed together and stirred until reaching a homogenous state. Following mixing, each ink formulation was filtered using a 1 µm absolute filter to create the thermal inkjet ink.

Print substrates included polyvinyl chloride (PVC), polyethylene terephthalate (PET), biaxially-oriented polypropylene (BOPP), coated polyethylene (PE) film, and aluminum foil. All printing was conducted using a NetJet inkjet printing system manufactured by Kirk-Rudy, Inc. of Woodstock, Georgia with a HP45 thermal inkjet system supplied by HP Inc. of Palo Alto, California. Images were printed with 600*300 dots per inch (DPI) at 150 ft/min without any pulse warming on the print substrates. Printed images were consistent with a QR code, a barcode, a nozzle check pattern, and a solid square with font size 12. The printed ink samples were evaluated for optical density, dry time, decap time, and barcode readability.

Optical Density. Optical density was measured with an exact Advanced spectrophotometer (SN: 00Z518; aperture: 4.0 mm; ISO Status "T" density with MO lighting source), which is available from Pantone LLC of Carlstadt, New Jersey. Optical density grades were assigned as follows: if the measured optical density was under 1.7, a "C" grade was assigned; if the measured optical density was between 1.7 and 2.0, a "B" grade was assigned; and if the measured optical density was higher than 2.0, an "A" grade was assigned.

Decap Time Evaluation: Decap time was measured by ascertaining the number of nozzles that correctly fired when printed 30 minutes following an initial test print. A nozzle check test pattern was printed initially to ensure that every nozzle was printing correctly before the test. Following the initial test, the print cartridge was retained in the cartridge holder for 30 minutes. At the conclusion of the 30-minute wait time, the nozzle check test pattern was printed five times. Decap time grades were assigned as follows: if more than five nozzles missed for the final print, a "C" grade was assigned; if the number of nozzles that missed for the final print was between one and five, a "B" grade was assigned; and if no nozzles missed for the final print, an "A" grade was assigned.

Dry Time Evaluation. Dry time was measured by press and movement of a thumb with gentle force on the printed QR code following a certain time after printing. Dry time grades were assigned as follows: if the ink still smears after 5 seconds from printing, a "C" grade was assigned; if dry time measured between 2 and 5 seconds from printing, a "B" grade was assigned; and if the ink was dry within 2 seconds from printing, then an "A" grade was assigned.

Barcode Readability: Barcode readability was measured by barcode verifier Axicon 6015, which is available from Axicon Auto ID Limited of Oxfordshire, United Kingdom. The results of the measurements were used to assign each printed barcode a grade. The American National Standards Institute (ANSI) standard for barcode readability was developed using alphabetic grading from A through D and then F. An "A" grade represents a preferred result, at least a C "grade" is required for a barcode to receive a "pass" grade, and a grade of "D" or "F" is considered a "fail" grade.

Satellite Evaluation: Images were printed with 600*300 dots per inch (DPI) at 250 ft/min without any pulse warming on the aforementioned print substrates. Printed images were consistent with a QR code, a barcode, a nozzle check pattern, and a solid square with font size 12. Evaluation of satellite formation was measured by barcode verifier Axicon 6015, which is available from Axicon Auto ID Limited of Oxfordshire, United Kingdom. The results of the measurements were used to assign each printed barcode a grade. The American National Standards Institute (ANSI) standard for barcode readability was developed using alphabetic grading from A through D and then F. An "A" grade represents a preferred result, at least a C "grade" is required for a barcode to receive a "pass" grade, and a grade of "D" or "F" is considered a "fail" grade.

As shown in FIGS. 3A-3C, the glass transition temperature of the terpene phenolic resin or rosin ester tackifier could be a significant factor in the decap performance. In this regard, Samples 3-5, 3-8, and 3-17 (with Tg close to 50° C.) showed very good decap performance. As shown in FIGS. 3A-3C, the usage of silicone-based surfactants and amino alcohols was shown to improve barcode readability and reduce satellite formation (which was observed in Samples 3-6, 3-7, and 3-8).

EXAMPLE 4. FIGS. 4A and 4B are a tabular representation of a variety of different thermal inkjet ink formulations and associated collected data in accordance with one or more aspects of the present invention. In particular, FIGS. 4A and 4B set forth formulations for Samples 4-1 through 4-9. FIGS. 4A and 4B include ink formulations that include a silicone acrylate copolymer, amino alcohol, terpene phenolic resin with varying base solvent and cosolvent loadings. FIGS. 4A and 4B also include ink formulations that utilize a terpene phenolic resin with an additional resin or tackifier present. Additionally, FIGS. 4A and 4B include ink formulations that include a black dye to create a black ink that is capable of sustained intermittent printing and adhesion to challenging substrates.

Components of each contemplated ink formulation are set forth in FIGS. 4A and 4B by weight percentage (for a total of 100%). Components of each formulation were mixed together and stirred until reaching a homogenous state. Following mixing, each ink formulation was filtered using a 1 µm absolute filter to create the thermal inkjet ink.

Print substrates included polyvinyl chloride (PVC), polyethylene terephthalate (PET), biaxially-oriented polypropylene (BOPP), coated polyethylene (PE) film, and aluminum foil. All printing was conducted using a NetJet inkjet printing system manufactured by Kirk-Rudy, Inc. of Woodstock, Georgia with a HP45 thermal inkjet system supplied by HP Inc. of Palo Alto, California. Images were printed with 600*300 dots per inch (DPI) at 150 ft/min without any pulse warming on the print substrates. Printed images were consistent with a QR code, a barcode, a nozzle check pattern, and a solid square with font size 12. The printed ink samples were evaluated for decap time/intermittent printing, dry time, and fluorescent glow.

Optical Density. Optical density was measured with an exact Advanced spectrophotometer (SN: 00Z518; aperture: 4.0 mm; ISO Status "T" density with MO lighting source), which is available from Pantone LLC of Carlstadt, New Jersey. Optical density grades were assigned as follows: if the measured optical density was under 1.7, a "C" grade was assigned; if the measured optical density was between 1.7 and 2.0, a "B" grade was assigned; and if the measured optical density was higher than 2.0, an "A" grade was assigned.

Decap Time Evaluation: Decap time was measured by ascertaining the number of nozzles that correctly fired when printed 30 minutes following an initial test print. A nozzle check test pattern was printed initially to ensure that every nozzle was printing correctly before the test. Following the initial test, the print cartridge was retained in the cartridge holder for 30 minutes. At the conclusion of the 30-minute wait time, the nozzle check test pattern was printed five times. Decap time grades were assigned as follows: if more than five nozzles missed for the final print, a "C" grade was assigned; if the number of nozzles that missed for the final print was between one and five, a "B" grade was assigned; and if no nozzles missed for the final print, an "A" grade was assigned.

Dry Time Evaluation. Dry time was measured by press and movement of a thumb with gentle force on the printed QR code following a certain time after printing. Dry time grades were assigned as follows: if the ink still smears after 5 seconds from printing, a "C" grade was assigned; if dry time measured between 2 and 5 seconds from printing, a "B" grade was assigned; and if the ink was dry within 2 seconds from printing, then an "A" grade was assigned.

Barcode Readability: Barcode readability was measured by barcode verifier Axicon 6015, which is available from Axicon Auto ID Limited of Oxfordshire, United Kingdom. The results of the measurements were used to assign each printed barcode a grade. The American National Standards Institute (ANSI) standard for barcode readability was developed using alphabetic grading from A through D and then F. An "A" grade represents a preferred result, at least a C "grade" is required for a barcode to receive a "pass" grade, and a grade of "D" or "F" is considered a "fail" grade.

Intermittent Print Performance: Intermittent print performance was measured by ascertaining the number of nozzles that correctly fired 5 minutes after a period of continuous printing. A nozzle check test pattern was printed initially to ensure that every nozzle was printing correctly before the test. Following the initial nozzle check test, the same nozzle check image was reprinted 500 times in succession before being left idle in the cartridge holder for 5 minutes. At the conclusion of the 5-minute wait time, the nozzle check test pattern was printed five times. Intermittent print performance grades were assigned as follows: if more than five nozzles missed for the final print, a "C" grade was assigned; if the number of nozzles that missed for the final print was between one and five, a "B" grade was assigned; and if no nozzles missed for the final print, an "A" grade was assigned.

As shown in FIGS. 4A and 4B, the greater usage of slower drying base solvents and cosolvents can be a significant factor for intermittent print performance, with a small trade off in dry time (which was observed in Samples 4-4 and 4-5). Greater adhesion to challenging substrates can be achieved through the usage of an additional resin (as observed in Samples 4-6, 4-7, 4-8, and 4-9). Additionally, the intermittent print performance of ink formulas utilizing additional resins could be improved through the incorporation of slower drying base solvents and cosolvents (which was observed in Samples 4-6 and 4-7)

EXAMPLE 5. FIGS. 5A and 5B are a tabular representation of a variety of different thermal inkjet ink formulations and associated collected data in accordance with one or more aspects of the present invention. In particular, FIGS. 5A and 5B set forth formulations for Samples 5-1 through 5-17. FIGS. 5A and 5B include ink formulations that include a terpene phenolic resin as a tackifier with one or more fluorescent agents, including a variety fluorescent dyes and optical brighteners. FIGS. 5A and 5B also include ink formulations that include one or more fluorescent agents and an additional resin or tackifier. Additionally, FIGS. 5A and 5B include ink formulations that include fluorescing agents to create an ink that invisible or transparent under the visible light spectrum, but can exhibit an identifying visible color under ultraviolet light.

Dry Time Evaluation. Dry time was measured by press and movement of a thumb with gentle force on the printed QR code following a certain time after printing. Dry time grades were assigned as follows: if the ink still smears after 5 seconds from printing, a "C" grade was assigned; if dry time measured between 2 and 5 seconds from printing, a "B" grade was assigned; and if the ink was dry within 2 seconds from printing, then an "A" grade was assigned.

Decap Time Evaluation: Decap time was measured by ascertaining the number of nozzles that correctly fired when printed 30 minutes following an initial test print. A nozzle check test pattern was printed initially to ensure that every nozzle was printing correctly before the test. Following the initial test, the print cartridge was retained in the cartridge holder for 30 minutes. At the conclusion of the 30-minute wait time, the nozzle check test pattern was printed five times. Decap time grades were assigned as follows: if more than five nozzles missed for the final print, a "C" grade was assigned; if the number of nozzles that missed for the final print was between one and five, a "B" grade was assigned; and if no nozzles missed for the final print, an "A" grade was assigned.

Fluorescent glow: Inks with a fluorescent component were exposed to UV light at the wavelength of 395 nm and/or 365 nm. Fluorescence grades were assigned as follows: if the glow was considered a "strong" glow, an "A" grade was assigned; if the glow was considered a "medium" glow, a "B" grade was assigned; and if the glow was considered a "weak" glow, a "C" grade was assigned.

As shown in FIGS. 5A and 5B, the solubility of fluorescent dye and optical brightener could be a significant factor for decap time and intermittent printing. Higher brightness could be achieved by increased loading of the dye and brightener but using care to avoid reaching a point where excess loading of components could settle out and clog the printhead (which was observed in Samples 5-4, 5-5, and 5-6). The introduction of higher vapor pressure, longer chain esters could help the solubility but could also result in longer drying time (which was observed in Samples 5-11 and 5-12). Greater adhesion and rub resistance on certain substrates could be achieved by using an additional resin in the ink formula (which was observed in Samples 5-13 and 5-14). Variation in the color or shade of fluorescent glow when exposed to UV light at the wavelengths of 395 nm or 365 nm could be achieved by utilizing a fluorescent agent which has a different emission wavelength (which was observed in Samples 5-15, 5-16, and 5-17).

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claim(s) appended hereto and the equivalents thereof.

What is claimed is:

1. A thermal inkjet ink for industrial printing applications comprising:
    a primary solvent that includes at least a short chain alcohol selected from a group that includes ethanol, 1-propanol, 2-propanol, and 1-butanol;
    a resin component consisting of a terpene phenolic resin, wherein no other resin component is present;
    one or more cosolvents that include at least an ester, which is selected from a group that includes methyl acetate, ethyl acetate, n-butyl acetate, and n-propyl acetate, or, a ketone, which is selected from a group that includes acetone, methyl ethyl ketone, methyl propyl ketone, and cyclohexanone;
    a colorant that includes a pigment, a dye, or a combination thereof;
    one or more surfactants selected from a group that includes a fluorine-based surfactant, a silicone-based surfactant, and an alkoxylated surfactant;
    one or more lubricants selected from a group that includes an amino alcohol, a fatty acid amide, and a phosphate ester; and
    one or more security taggants.

2. The thermal inkjet ink of claim 1, wherein the one or more security taggants includes an ultraviolet marker identifiable via ultraviolet light.

3. The thermal inkjet ink of claim 2, wherein the ultraviolet marker fluoresces a blue color under ultraviolet light.

4. A thermal inkjet ink for industrial printing applications comprising:
    a solvent that includes at least a non-ethanol short chain alcohol selected from a group that includes 1-propanol, 2-propanol, and 1-butanol;
    one or more cosolvents that include at least an ester, which is selected from a group that includes methyl acetate, ethyl acetate, n-butyl acetate, and n-propyl acetate, or, a ketone, which is selected from a group that includes acetone, methyl ethyl ketone, methyl propyl ketone, and cyclohexanone, the one or more cosolvents being approximately 0.1 wt % to approximately 30 wt % of the thermal inkjet ink;
    a resin component consisting of a terpene phenolic resin, the resin component being approximately 0.1 wt % to approximately 20 wt % of the thermal inkjet ink, wherein no other resin component is present; and
    a colorant that includes a pigment, a dye, or a combination thereof, the colorant being approximately 0.1 wt % to approximately 15 wt % of the thermal inkjet ink.

5. The thermal inkjet ink of claim 4, further comprising one or more surfactants selected from a group that includes a fluorine-based surfactant, a silicone-based surfactant, and an alkoxylated surfactant, the one or more surfactants being approximately 0.1 wt % to approximately 5 wt % of the thermal inkjet ink.

6. The thermal inkjet ink of claim 4, further comprising one or more lubricants selected from a group that includes an amino alcohol, a fatty acid amide, and a phosphate ester, the one or more lubricants being approximately 0.1 wt % to approximately 4 wt % of the thermal inkjet ink.

7. The thermal inkjet ink of claim 4, further comprising one or more security taggants selected from a group that includes an ultraviolet security taggant, an infrared security taggant, and upconversion nanoparticles, the one or more security taggants being approximately 0.1 wt % to approximately 20 wt % of the thermal inkjet ink.

8. The thermal inkjet ink of claim 7, wherein at least one of the one or more security taggants includes an ultraviolet marker identifiable via ultraviolet light.

9. The thermal inkjet ink of claim 8, wherein the ultraviolet marker fluoresces a blue color under ultraviolet light.

10. The thermal inkjet ink of claim 4, further comprising:
    one or more surfactants selected from a group that includes a fluorine-based surfactant, a silicone-based surfactant, and an alkoxylated surfactant, the one or more surfactants being approximately 0.1 wt % to approximately 5 wt % of the thermal inkjet ink; and
    one or more lubricants selected from a group that includes an amino alcohol, a fatty acid amide, and a phosphate ester, the one or more lubricants being approximately 0.1 wt % to approximately 4 wt % of the thermal inkjet ink.

11. The thermal inkjet ink of claim 4, further comprising:
    one or more surfactants selected from a group that includes a fluorine-based surfactant, a silicone-based surfactant, and an alkoxylated surfactant, the one or more surfactants being approximately 0.1 wt % to approximately 5 wt % of the thermal inkjet ink; and
    one or more security taggants selected from a group that includes an ultraviolet security taggant, an infrared security taggant, and upconversion nanoparticles, the one or more security taggants being approximately 0.1 wt % to approximately 20 wt % of the thermal inkjet ink.

12. The thermal inkjet ink of claim 4, further comprising:
    one or more lubricants selected from a group that includes an amino alcohol, a fatty acid amide, and a phosphate ester, the one or more lubricants being approximately 0.1 wt % to approximately 4 wt % of the thermal inkjet ink; and
    one or more security taggants selected from a group that includes an ultraviolet security taggant, an infrared security taggant, and upconversion nanoparticles, the one or more security taggants being approximately 0.1 wt % to approximately 20 wt % of the thermal inkjet ink.

13. The thermal inkjet ink of claim 4, further comprising:
one or more surfactants selected from a group that includes a fluorine-based surfactant, a silicone-based surfactant, and an alkoxylated surfactant, the one or more surfactants being approximately 0.1 wt % to approximately 5 wt % of the thermal inkjet ink;
one or more lubricants selected from a group that includes an amino alcohol, a fatty acid amide, and a phosphate ester, the one or more lubricants being approximately 0.1 wt % to approximately 4 wt % of the thermal inkjet ink; and
one or more security taggants selected from a group that includes an ultraviolet security taggant, an infrared security taggant, and upconversion nanoparticles, the one or more security taggants being approximately 0.1 wt % to approximately 20 wt % of the thermal inkjet ink.

14. A thermal inkjet ink for industrial printing applications consisting of:
at least one short chain alcohol selected from a group consisting of 1-propanol, 2-propanol, and 1-butanol;
at least one cosolvent selected from a group consisting of an ester cosolvent and a ketone cosolvent, the at least one cosolvent being approximately 0.1 wt % to approximately 30 wt % of the thermal inkjet ink;
a terpene phenolic resin component, the terpene phenolic resin component being approximately 0.1 wt % to approximately 20 wt % of the thermal inkjet ink;
at least one colorant selected from a group consisting of a pigment, a dye, or a combination of a pigment and a dye, the at least one colorant being approximately 0.1 wt % to approximately 15 wt % of the thermal inkjet ink;
at least one surfactant selected from a group consisting of a fluorine-based surfactant, a silicone-based surfactant, and an alkoxylated surfactant, the at least one surfactant being approximately 0.1 wt % to approximately 5 wt % of the thermal inkjet ink;
at least one lubricant selected from a group consisting of an amino alcohol, a fatty acid amide, and a phosphate ester, the at least one lubricant being approximately 0.1 wt % to approximately 4 wt % of the thermal inkjet ink; and
a security taggant capable of fluorescing under ultraviolet light, the security taggant being approximately 0.1 wt % to approximately 20 wt % of the thermal inkjet ink.

15. The thermal inkjet ink of claim 14, wherein, the ester cosolvent is selected from a group consisting of methyl acetate, ethyl acetate, n-butyl acetate, and n-propyl acetate.

16. The thermal inkjet ink of claim 14, wherein the ketone cosolvent is selected from a group consisting of acetone, methyl ethyl ketone, methyl propyl ketone, and cyclohexanone.

17. The thermal inkjet ink of claim 14, wherein the security taggant fluoresces a blue color under ultraviolet light.

* * * * *